(12) United States Patent
Bradshaw et al.

(10) Patent No.: US 10,437,662 B2
(45) Date of Patent: Oct. 8, 2019

(54) CRASH RECOVERY USING NON-VOLATILE MEMORY

(71) Applicant: MICROSOFT TECHNOLOGY LICENSING, LLC, Redmond, WA (US)

(72) Inventors: Dexter Paul Bradshaw, Duvall, WA (US); Pedro Celis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 15/411,853

(22) Filed: Jan. 20, 2017

(65) Prior Publication Data

US 2017/0132071 A1 May 11, 2017

Related U.S. Application Data

(63) Continuation of application No. 14/069,028, filed on Oct. 31, 2013, now Pat. No. 9,558,080.

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/079* (2013.01); *G06F 11/0727* (2013.01);
(Continued)

(58) Field of Classification Search
CPC ............. G06F 11/0793; G06F 11/0751; G06F 11/0727; G06F 11/079; G06F 11/1474;
(Continued)

(56) References Cited

U.S. PATENT DOCUMENTS 5,524,205 A 6/1996 Lomet et al.
5,918,225 A * 6/1999 White .................... G06F 16/30
(Continued)

FOREIGN PATENT DOCUMENTS

CN 101903866 A 12/2010
GB 2256952 A 12/1992

OTHER PUBLICATIONS

Wikipedia "CPUcache" page from date Oct. 26, 2013 retrieved using the WayBackMachine, from https://web.archive.org/web/20131026231549/https://en.wikipedia.org/wiki/CPU_cache (Year: 2013).*

(Continued)

*Primary Examiner* — Yair Leibovich
(74) *Attorney, Agent, or Firm* — Workman Nydegger (57) ABSTRACT

Crash recovery of a computing system in the context in which the computing system includes a volatile memory which has contents lost due to the crash, an intermediate non-volatile memory that (together with the volatile memory) contributes to the active memory of the computing system, and non-volatile storage. The recovery occurs by identifying pages that were in the volatile memory at the time of the crash and that are in the intermediate non-volatile memory and recovers those pages into the volatile memory. In embodiments in which access speeds for the intermediate non-volatile memory may be much faster than for the storage, and in which much of the pages to be recovered are recovered from the intermediate non-volatile memory, the recovery time may be reduced.

20 Claims, 7 Drawing Sheets

(51) Int. Cl.
*G06F 11/14* (2006.01)
*G06F 11/16* (2006.01)

(52) U.S. Cl.
CPC ...... *G06F 11/0751* (2013.01); *G06F 11/1441* (2013.01); *G06F 11/1469* (2013.01); *G06F 11/1471* (2013.01); *G06F 11/1474* (2013.01); *G06F 11/1666* (2013.01); *G06F 2201/84* (2013.01)

(58) Field of Classification Search
CPC ............ G06F 11/1441; G06F 11/1469; G06F 11/1471; G06F 11/1666; G06F 2201/84
USPC .......................................................... 714/15
See application file for complete search history.

(56) References Cited

U.S. PATENT DOCUMENTS

| | | | | |
|---|---|---|---|---|
| 7,904,427 | B2* | 3/2011 | Lomet | G06F 16/2322 707/674 |
| 8,984,247 | B1* | 3/2015 | Lo | G06F 12/0238 711/165 |
| 9,361,044 | B2* | 6/2016 | Chiu | G06F 3/0619 |
| 9,558,080 | B2* | 1/2017 | Bradshaw | G06F 11/1471 |
| 2005/0081091 | A1 | 4/2005 | Bartfai et al. | |
| 2006/0059209 | A1 | 3/2006 | Lashley | |
| 2008/0120470 | A1* | 5/2008 | Dhamankar | G06F 16/2358 711/135 |
| 2008/0209109 | A1* | 8/2008 | Lasser | G06F 12/0246 711/103 |
| 2010/0199045 | A1 | 8/2010 | Bell et al. | |
| 2010/0223243 | A1 | 9/2010 | Huras et al. | |
| 2011/0219169 | A1 | 9/2011 | Zhang et al. | |
| 2012/0109895 | A1 | 5/2012 | Zwilling et al. | |
| 2013/0042156 | A1* | 2/2013 | Srinivasan | G06F 11/1443 714/54 |
| 2013/0191578 | A1 | 7/2013 | Goss et al. | |
| 2014/0019688 | A1 | 1/2014 | Ghodsnia et al. | |
| 2014/0337562 | A1* | 11/2014 | Long | G06F 3/0659 711/103 |

OTHER PUBLICATIONS

"CPU cache", Retrieved from <<https://web.archive.org/web/20131026231549/http://en.wikipedia.org/wiki/CPU_Cache#Multi-level_caches>>, Retrieved Date: Oct. 26, 2013, 18 Pages.
"Final Office Action issued in U.S. Appl. No. 14/069,028", dated Sep. 17, 2015, 12 Pages.
"Non Final Office Action issued in U.S. Appl. No. 14/069,028", dated Feb. 12, 2016, 15 Pages.
"Non Final Office Action issued in U.S. Appl. No. 14/069,028", dated Jun. 4, 2015, 10 Pages.
"Notice of Allowance Issued in U.S. Appl. No. 14/069,028", dated Oct. 7, 2016, 10 Pages.
Alvarez, Victor, "SQL Server—Checkpoint", Retrieved from <<http://sqlpost.blogspot.in/2009/06/sql-server-checkpoint.html>>, Jun. 22, 2009, 2 Pages.
Bhattacharjee, et al., "Enhancing Recovery Using an SSD Buffer Pool Extension", In Proceedings of the Seventh International Workshop on Data Management on New Hardware, Jun. 13, 2011, 7 Pages.
Do, et al., "Turbocharging DBMS Buffer Pool Using SSDs", In Proceedings of the International Conference on Management of Data ACM SIGMOD, Jun. 12, 2011, 12 Pages.
Mohan, et al., "ARIES: A Transaction Recovery Method Supporting Fine-Granularity Locking and Partial Rollbacks Using Write-Ahead Logging", In Journal ACM Transactions on Database Systems (TODS), vol. 17, Issue 1, Mar. 1, 1992, pp. 94-162.
"International Search Report and Written Opinion issued in PCT Patent Application No. PCT/US2014/062313", dated May 4, 2015, 15 Pages.
"First Office Action and Search Report Issued in Chinese Patent Application No. 201480060820.8", dated Feb. 5, 2018, 13 Pages.

* cited by examiner

CRASH RECOVERY USING NON-VOLATILE MEMORY

CROSS-REFERENCE TO RELATED APPLICATIONS

This application is a continuation of U.S. patent application Ser. No. 14/069,028 filed on Oct. 31, 2013, entitled "CRASH RECOVERY USING NON-VOLATILE MEMORY," which issued as U.S. Pat. No. 9,558,080 on Jan. 31, 2017, and which application is expressly incorporated herein by reference in its entirety.

BACKGROUND

Applications often use volatile memory to operate efficiently. During operation, data is read from mechanical disk into memory and potentially also written back to mechanical disk in discretely sized components called "pages". A buffer pool is memory used to cache blocks of memory (such as pages) as the blocks are being read from mechanical disk, or being modified in memory. The buffer pool improves performance by allowing data to be accessed from memory instead of from mechanical disk. As an example only, databases often use buffer pools in order to manage and index pages in memory.

As a system operates, the system will randomly access a working set of pages. Over time, as the system operates, that working page set will change, which often also leads to a change in size of the working page set. If the working page set is larger than the available buffer pool in the random access memory (RAM), then the system performs more random access operations from mechanical disk.

A mechanical disk is structured with a mechanical rotational magnetic media in which a disk head sweeps a magnetic platter to read and access data. Sequential read/writes are more efficient because they do not involve a mechanical sweep of the disk head, but merely involve the electronic transmission delay from the disk head and controller circuitry to memory. Thus, mechanical disk operations are much more efficiently used for sequential operations, while random access operations to mechanical disk can significantly reduce system performance. As the working page set becomes larger than the buffer pool, and thus pages have to be moved out of the buffer pool and written to disk using random access operations. Accordingly, as the working set becomes larger than the buffer pool, system performance degrades.

BRIEF SUMMARY

At least one embodiment described herein relates to crash recovery of a computing system that includes a volatile memory which has contents lost due to the crash, an intermediate non-volatile memory that, together with the volatile memory, contributes to the active memory of the computing system, and non-volatile storage. The recovery occurs by identifying pages that were in the volatile memory at the time of the crash. For each of these pages, the recovery determines whether to recover the page into the volatile memory from either the intermediate non-volatile memory or the storage, and then performs the recovery. In some embodiments in which the computing system is transaction-enabled, the recovery also identifies transactions that were active at the time of the crash, and undoes the actions of each of those transactions.

Access speeds for the intermediate non-volatile memory may be much faster than for storage such as disk or spinning media storage. For instance, the intermediate non-volatile memory might be storage class memory (SCM) such as a solid state disk (SSD). Thus, in cases in which much of the pages to be recovered are recovered from the intermediate non-volatile memory, versus the storage, the recovery time may be reduced, even perhaps greatly.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, crash recovery of a computing system is described. The computing system includes a volatile memory which has contents lost due to the crash, an intermediate non-volatile memory that (together with the volatile memory) contributes to the active memory of the computing system, and non-volatile storage. The recovery occurs by identifying pages that were in the volatile memory at the time of the crash. For each of these pages, the recovery determines whether to recover the page into the volatile memory from either the intermediate non-volatile memory or the storage, and then performs the recovery. In embodiments in which access speeds for the intermediate non-volatile memory may be much faster than for the storage, and in which much of the pages to be recovered are recovered from the intermediate non-volatile memory, the end-to-end recovery time may be reduced. The end-to-end recovery time includes crash recovery time as well as restart or ramp-up time to get the system back up to performance equilibrium. First, some introductory discussion regarding a computing system will be described with respect to FIG. 1. Then, embodiments of the recovery will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
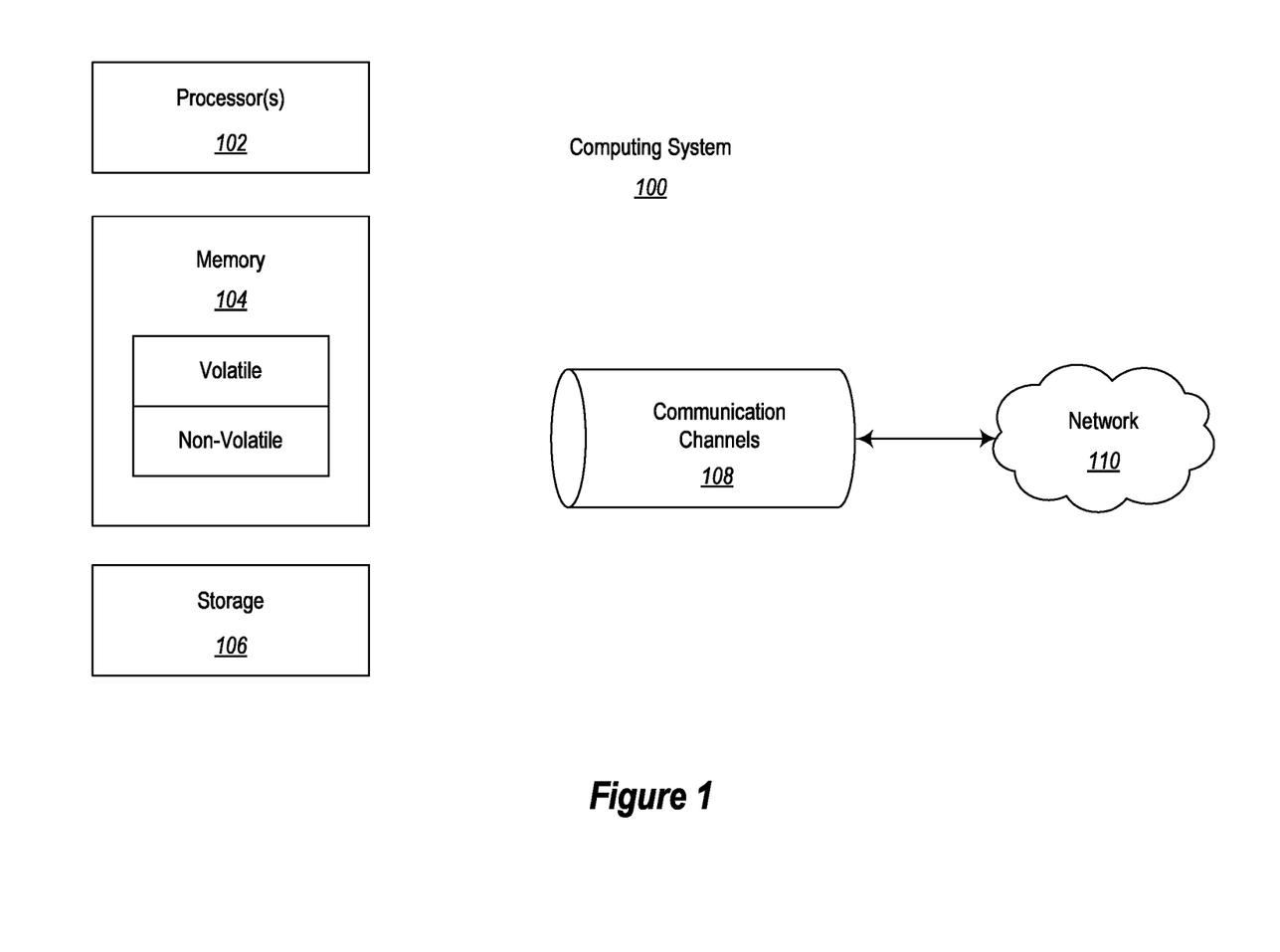
FIG. 1 illustrates a computing system in which some embodiments described herein may be employed.

As illustrated in FIG. 1, a computing system 100 includes at least one processing unit 102 and memory 104. The memory 104 may be physical system memory, which may be volatile, non-volatile, or some combination of the two. The computing system 100 also includes non-volatile memory or storage 106. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 and/or storage 106 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include computer program products in the form of one or more physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions, such as the functions described herein. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
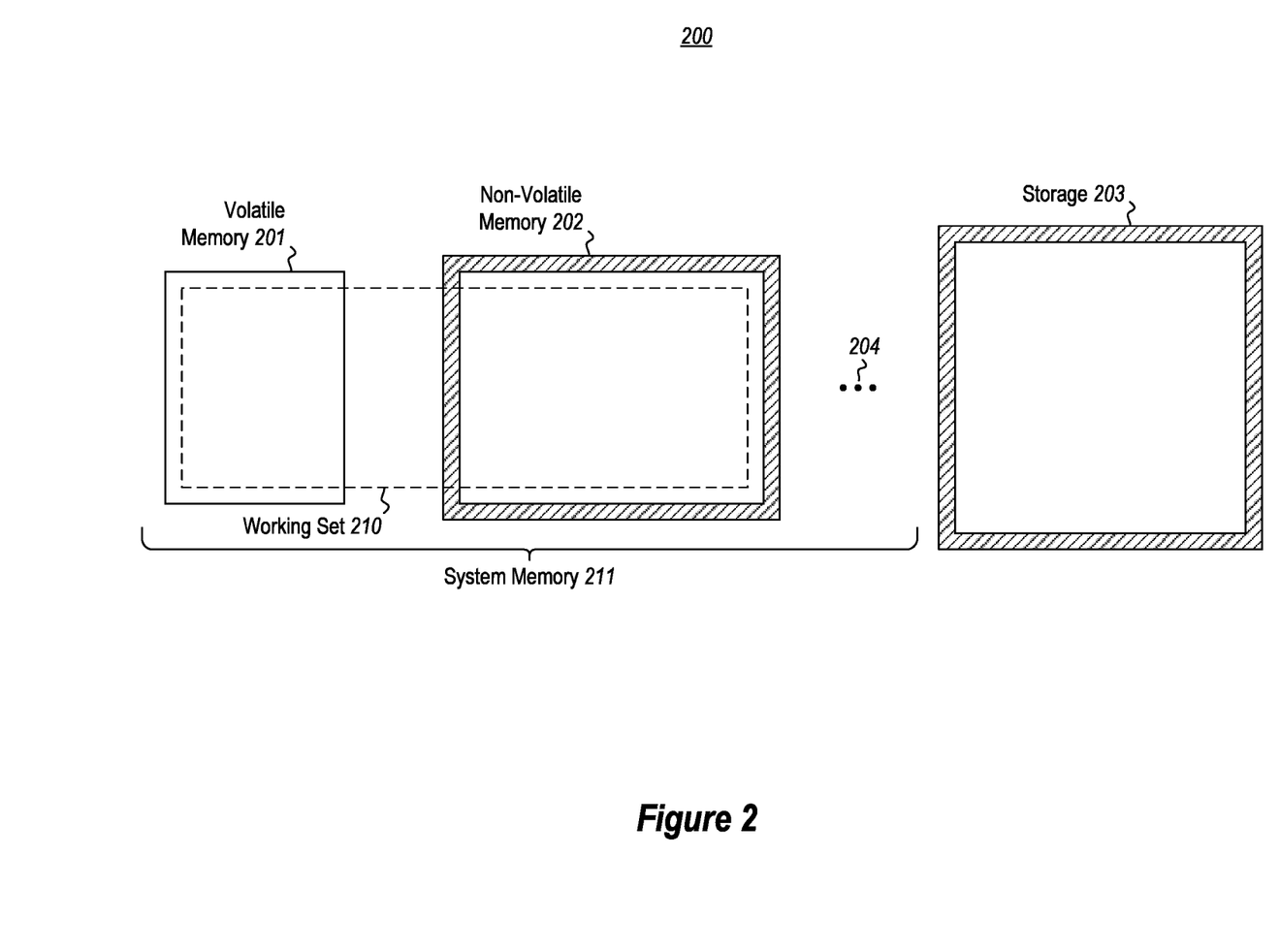
FIG. 2 illustrates a memory hierarchy that includes a volatile memory, non-volatile storage and intermediate non-volatile memory.

FIG. 2 illustrates a memory hierarchy 200 that includes a volatile memory 201, non-volatile storage 203 and intermediate non-volatile memory 202. The non-volatile memory 202 and non-volatile storage 203 are shown with thicker cross-hatched borders symbolizing that their contents most typically will survive a power loss. However, the contents of volatile memory 201 rely on power in order to refresh its contents, and thus the contents of the volatile memory 201 will be lost upon a power loss. For instance, if the memory hierarchy 200 were present in the computing system 100 of FIG. 1, volatile memory 201 would be an example of the volatile portion of the memory 104 of FIG. 1, intermediate non-volatile memory 202 would be an example of the non-volatile portion of the memory 104 of FIG. 1, and non-volatile storage 203 would be an example of the storage 106 of FIG. 1.

The intermediate non-volatile memory 202 may include a single level in the memory hierarchy 200. However, in some embodiments, there may be more than one intermediate non-volatile memory level in the memory hierarchy 200 as represented by the ellipses 204. For instance, there might be one portion of the non-volatile memory 202 that has faster access speeds (i.e., higher in the memory hierarchy) than another portion of the non-volatile memory 203 that has lower access speeds (i.e., lower in the memory hierarchy).

The volatile memory 201 and the non-volatile memory 202 may together comprise the system memory 211 of the computing system, the system memory 211 including the range of addresses that are addressable by the processor(s) of the computing system. The system memory 211 includes the working set 210 of pages that are more frequently acted upon by the computing system. The working set 210 represents the data and instructions that are being actively used by the computing system in order to perform its current function. The working set 210 has the characteristic of having more random accesses. The volatile memory 201 has efficient random access speed (hence the term "Random Access Memory" or "RAM"). However, the non-volatile memory 202 is also efficient at random accesses, especially as compared to the storage 203, which is better suited for sequential access. Thus, the non-volatile memory 202 and the volatile memory 201 together act as a large random access memory, and together provide the capability of working with a much larger working set 210 than would be possible with the volatile memory 201 alone.

As an example, the intermediate non-volatile memory 202 may be storage class memory, such as a solid state disk. The term "storage class memory" is known in the art, and this description incorporates the known definition of the term. A storage class memory has the following properties.
1. The memory is solid state;
2. The memory is randomly accessible;
3. The memory has lower latency than mechanical disk;
4. The memory has random I/O throughput greater than mechanical disk because random access is a solid-state electronic process with no mechanical movement of a disk head.

In addition, the storage class memory is non-volatile when used as the non-volatile memory 202 of FIG. 2.

A solid state disk is a type of storage class memory and distinguishes from mechanical disk by being a solid state device. The solid state disk additionally has the following properties which may also be included in some, but perhaps not all, of other types of storage class memory that may be used with the principles described herein:
1. High granularity random access.
2. Larger capacities than DRAM (capacity is in the order of that of magnetic disk).
3. Higher transistor densities than DRAM more store per unit of area (and volume).
4. Lower power consumption and dissipation than spinning media and DRAM.
5. Typically no Direct Memory Access between the SSD and disk. Instead, the data has to flow through DRAM to get to disk.

Other types of storage class memories include Phase Change Memory (PCM), Ferrous Oxide, and Memristor, which potentially have lower latencies and better access granularities than storage class disks. However, the principles described herein are not even limited to currently existing storage class memory technology, and may be extended to apply to storage class memory technology developed in the future or to any second level memory other than storage class memory also.

Referring again to FIG. 2, in the embodiments described herein, the memory hierarchy operations in data segments referred to as "pages". In this description and in the claims, a "page" is defined as any group of data that is exchanged as an entire entity between the system memory 211 and the storage 203, and/or between the volatile memory 201 and the non-volatile memory 202. Furthermore, although not required, the system memory 211 may have an escalation and eviction mechanism by which pages that are used more frequently tend to be loaded higher in the memory hierarchy, and pages that are used less frequently tend to be evicted to lower levels in the memory hierarchy. In some cases, when a page is read from the non-volatile memory 202 into the volatile memory 201, a copy of the page is retained within the non-volatile memory 202. Furthermore, in some cases, when a page is read from the storage 203 into the non-volatile memory 202 or the volatile memory 201, a copy of the page is retained within the storage 203.

Figure 3:
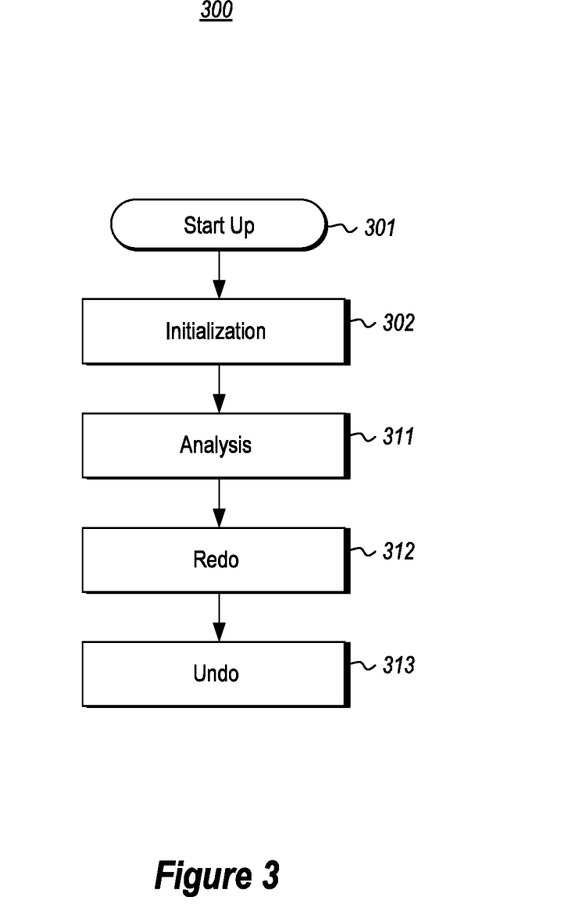
FIG. 3 illustrates an example general flow associated with the recovery of the computing system having a memory hierarchy.

FIG. 3 illustrates an example general flow 300 associated with the recovery of the computing system 100 having memory hierarchy 200. Upon startup (startup 301) after a power loss, the computing system enters an initialization phase 302, followed by an analysis phase 311, followed by a redo phase 312, and in a transactional system, followed by an undo phase 313.

At this point, it is noted that conventional recovery algorithms also use an analysis, recovery, and redo phase. For instance, Algorithms for Recovery and Isolation Exploiting Semantics (hereinafter "ARIES") is a recovery algorithm that includes such phases. However, ARIES is designed for database recovery in an environment in which the system memory is entirely rebuilt by reading pages from storage back into memory. The principles described herein build on top of ARIES and reduce recovery time by restoring pages into the volatile memory 201 from the non-volatile memory 202, as well as from the storage 203. In fact, if normal forward processing is further modified to include snapshots (also referred to as "checkpoints") into non-volatile memory 202, the recovery time may be further reduced especially if the snapshots to non-volatile memory 202 are frequent, and more frequent that the snapshots to storage 203. This checkpointing is an optimization that reduces the size of the log. The checkpointing thus reduces the number of redo and undo actions that have to be performed during crash recovery.

FIG. 3 will be referred to frequently when describing further recovery details below. FIG. 3 is a general diagram, but more specifics regarding what functions might be performed in which phase will be outlined in further detail below. In the recovery described hereinbelow, normal processing is modified to include two types of snapshots, a less frequent snapshot to storage 203, and a new more frequent snapshot to non-volatile memory 202. Furthermore, the analysis phase of the ARIES algorithm is modified to formulate the analysis phase 311 of FIG. 3. Also, the redo phase of the ARIES algorithm is modified to formulate the redo phase 312 of FIG. 3.

Figure 4:
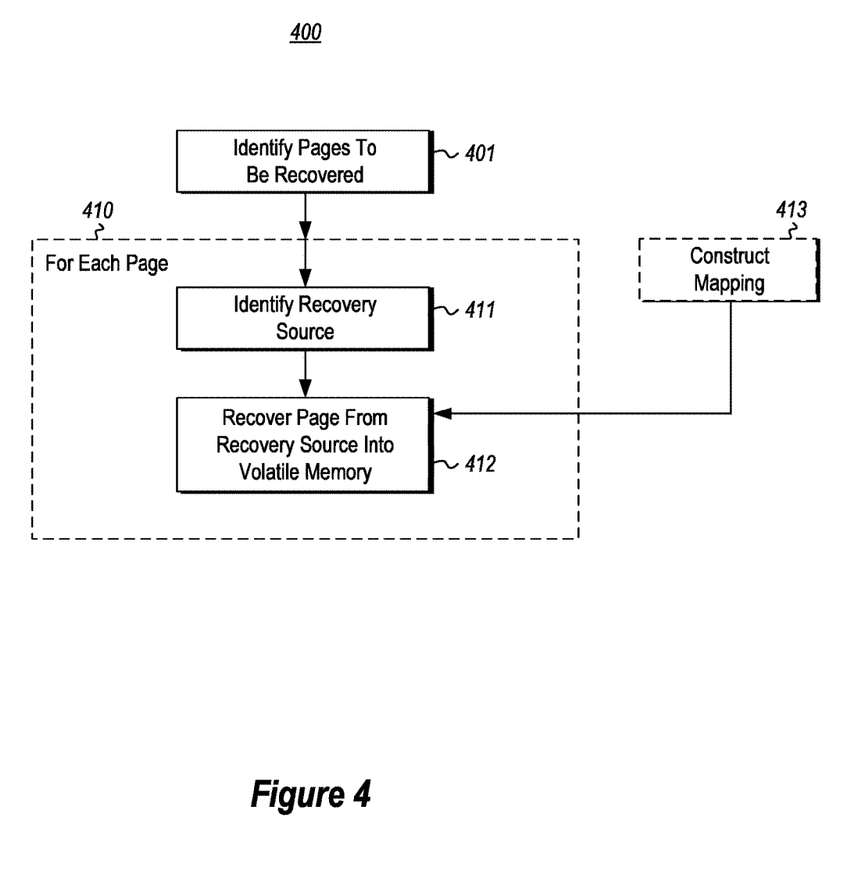
FIG. 4 illustrates a flowchart of a method for recovering from a crash of the computing system in which contents of the volatile memory is lost.

FIG. 4 illustrates a flowchart of a method 400 for recovering from a crash of the computing system in which contents of the volatile memory is lost. The method 400 may be performed in the context of the computing system 100 having memory hierarchy 200 and thus the method 400 will be described with frequent reference to FIGS. 1 and 2. Furthermore, the recovery may follow the general flow 300 of FIG. 3, and thus the method 400 will also be described with frequent reference to FIG. 3.

The method 400 involves automatically identifying pages that were in the volatile memory at the time of the crash (act 401). These identified pages will also be the pages that are to be recovered back into the volatile memory 201 in order for the system to recover. With reference to FIG. 2, recall that the contents of non-volatile memory 202 and non-volatile storage 203 are kept despite the loss of power of the computing system. However, the volatile memory 201 requires power in order to maintain its contents. Accordingly, all of the pages that were in volatile memory 201 are lost when power is lost. Referring to FIG. 3, the identification of the pages that were in the volatile memory at the time of the crash might be performed during the analysis phase 311 in the specific examples provided below.

For each of these pages that were in the volatile memory at crash time, the context of box 410 are performed. Specifically, the system automatically determines a source of a recovery version of the page (act 411). In other words, the system determines whether to recover the page from the storage 203 or the non-volatile memory 202 of the computing system. The recovery source could be the storage 203 like in conventional recovery mechanisms such as ARIES recovery.

However, unlike conventional recovery mechanisms, the recovery source might also be the intermediate non-volatile memory 202. If there are multiple memory levels of the intermediate non-volatile memory 202, the system may also determine which memory level of the intermediate non-volatile memory 202 to load the page from in cases in which the recover version is located in the intermediate non-volatile memory 202. Referring to FIG. 3, the identification of the recovery source might be performed in the analysis phase 311 in the specific example provided below.

For each page to be recovered, the page is then loaded from the recovery source into the volatile memory (act 412). For instance, if the recovery version of the page was located in the non-volatile memory 202, the page would be loaded into the volatile memory 201 from the non-volatile memory 202. On the other hand, if the recovery version of the page was located in the storage 203, the page would be loaded into the volatile memory 201 from the storage 203. In some instances, during normal operation, when a page is read from the non-volatile memory 202 into the volatile memory 201, a copy of the page is retained within the non-volatile memory 202. In that case, most of the recovered pages may be recovered from the non-volatile memory 202 as opposed to the storage 203. Thus, since random access speeds from the non-volatile memory 202 are much faster than from storage 203, this significantly quickens the recovery time. Referring to FIG. 3, the loading of pages from non-volatile memory 202 or from storage 203 may be part of the redo phase 312 in the specific example provided below.

Optionally, the system constructs a mapping (act 413) that identifies a location of a recovery version of each page within the intermediate non-volatile memory for each page that has a recovery version within the intermediate non-volatile memory. Referring to FIG. 3, this might be performed during the initialization phase 302. The loading of the page from the recovery source (act 412) uses this mapping to find the location of each recovery version for pages whose recovery version is located within the intermediate non-volatile memory. Once all the pages that were present in the volatile memory 201 prior to the crash are loaded from their respective recovery sources back into the volatile memory 201, the volatile memory 201 regains the pages that it had at the time of the crash.

Figure 5:
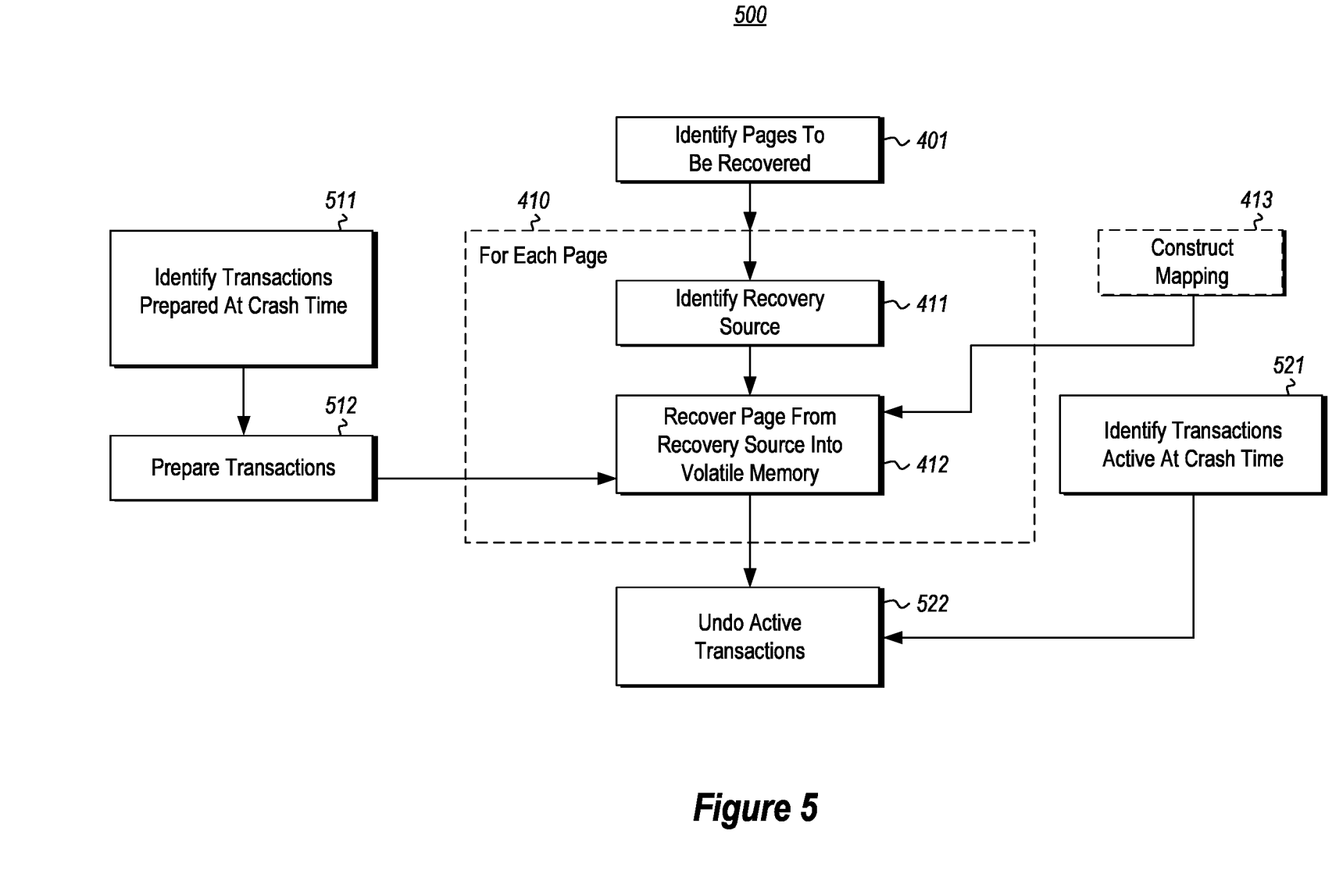
FIG. 5 illustrates a flowchart of a more specific method for recovering from a crash of the computing system in which contents of the volatile memory is lost in the context of the system being a transactional system.

FIG. 5 illustrates a flowchart of a more specific method 500 for recovering from a crash of the computing system in which contents of the volatile memory is lost in the context of the system being a transactional system. The method 500 is a specific example of the method 400 of FIG. 4, but includes some additional acts. Accordingly, the acts 401, 410, 412 and 413 of the method 400 are illustrated again within FIG. 5.

In a transactional system, the system determines which transactions were prepared at the time of the crash (act 511). Referring to FIG. 3, the identification of the pending transactions may be performed during the analysis phase 311 in the example below. The system then prepares each of the transactions that were prepared at crash time (act 512) prior to loading the pages from the recovery source into the volatile memory (act 412). Referring to FIG. 3, the preparing of the transactions may be performed as part of the analyses phase 311.

There may be transactions that may have been committed. The changes to these committed transaction have been recorded in the log, but the affected pages may not have made it out to storage 203. After the analysis phase, during the redo phase, the stale versions of these pages are read back into the volatile memory 201 with the old and un-updated data. The redo phase reapplies the changes for the page starting from the pentultimate checkpoint for that particular page. At the end of the redo phase, all changes would have been committed to those pages but the changes to uncommitted transactions are also applied to those pages. Hence the need for an undo phase which reverses the changes of uncommitted transactions bringing all active pages before the system crash back to a consistent state.

For transactions that were active (i.e., uncommitted) at crash time, those transactions should fail due to the crash in order to bring the system into a transactionally consistent state. Accordingly, the system identifies transactions that were active at crash time (act 521). Referring to FIG. 3, this identification of active transactions may occur as part of the analysis phase 311 in the specific example provided below. The system then undoes all actions of each of the active transactions (act 522) after all of the pages are recovered into the volatile memory (act 412). Referring to FIG. 3, the undoing of such transactions might be performed as part of the undo phase 313 in the specific example provided herein.

Figure 6:
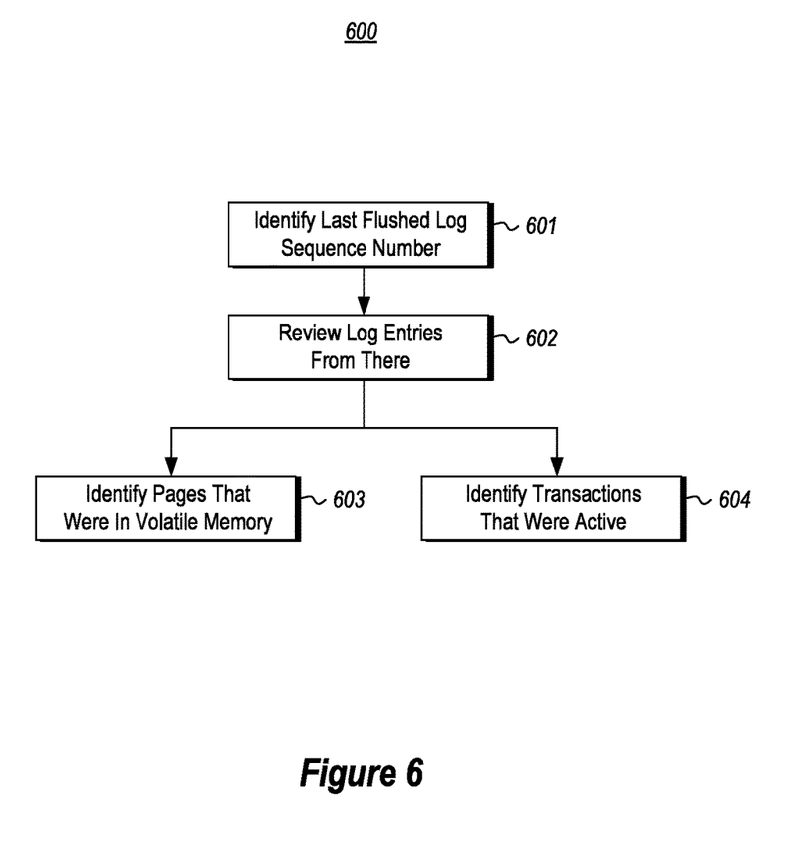
FIG. 6 illustrates a flowchart of a method for automatically identifying the plurality of pages that were in the volatile memory at crash time, and automatically identifying transactions that were active at the time of the crash.

FIG. 6 illustrates a flowchart of a method 600 for automatically identifying the plurality of pages that were in the volatile memory at crash time, and automatically identifying transactions that were active at the time of the crash. The method 600 represents one example of the act 401 of FIGS. 4 and 5 (in the case of identifying pages that were in volatile memory at crash time) and act 521 of FIG. 5 (in the case of identifying transactions active at crash time). The method 600 may be performed during the analysis phase 311 in the specific example provided below.

The system identifies the last log sequence number flushed to a log in the non-volatile storage (act 601), and then sequentially reviews the log entries of the log from this last flushed log sequence number (act 602). Based the analysis of the log entries, the system identifies the pages that were in the volatile memory at crash time (act 603), and also identifies transactions that were active at the time of the crash (act 604).

Figure 7:
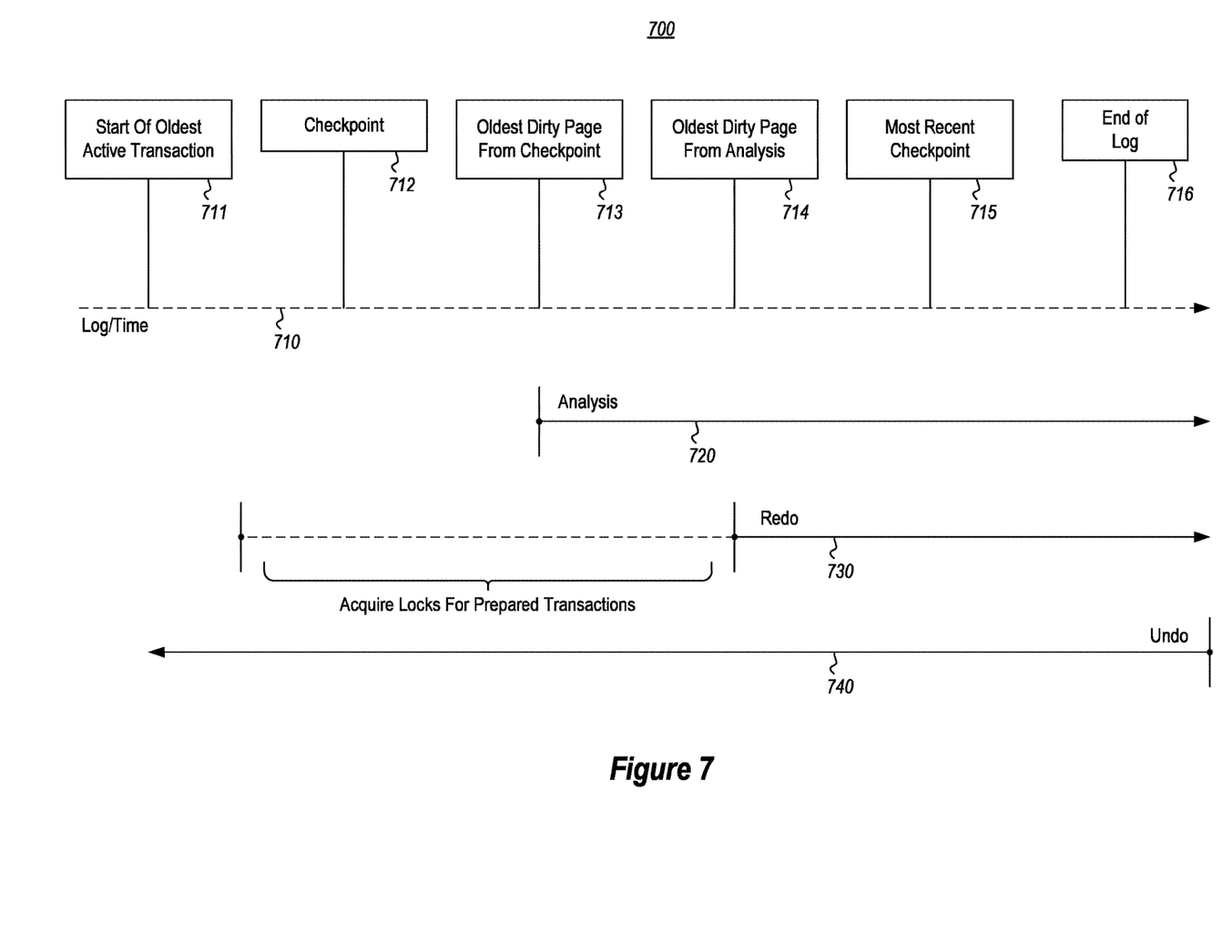
FIG. 7 illustrates a time line of a log in the context of an example analysis phase, redo phase and undo phase.

FIG. 7 illustrates the three phases including the analysis phase 720, the redo phase 730 and the undo phase 740 in the context of a log timeline 710. The analysis phase 720, the redo phase 730 and the undo phase 740 of FIG. 7 are examples of the analysis phase 311, the redo phase 312, and the undo phase 313, respectively, of FIG. 3.

As the computing system operates normally, the computing system maintains a log of significant events. For instance, in FIG. 7, amongst other things, the computing system logged the start of active transactions, when checkpoints occur, when a page becomes dirty (i.e., is written to in the system memory 211 without being written to the storage 203), and so forth. When an event is written to the log, the event is assigned some type of identification in which the order of events can be derived based on the assigned identification. For instance, the identification might be a log sequence number in which the log sequence number is incremented for each event recorded. Thus, events that are later in the log have a higher log sequence number than events that are earlier in the log.

In the example embodiment of FIG. 7, the computing system also writes certain items of information into a portion of storage that is accessible during boot time. For instance, the information may be written into the boot block of the computing system. The information includes the log sequence number of the last checkpoint, as well as a globally unique identifier of the last page file flushed from the system memory 211 into the storage 203. The page file includes all of the pages included within the non-volatile memory 202. The globally unique identifier is altered each time a page in the page file is altered (e.g., each time the page file is created, deleted, formatted with a new version, or any other alteration) in the non-volatile memory 202.

In this embodiment, the analysis phase 720 has a number of functions including identifying 1) at what point in the log the redo phase 730 should begin, 2) what pages need to be redone (i.e., loaded into volatile memory 201), 3) what transactions were active at the time of the crash, and 4) what transactions were prepared at the time of the crash.

In the analysis phase 720, the log is scanned to identify pages that need to be loaded into non-volatile memory. To do this, the analysis first determines where to start scanning the log moving forward. The globally unique identifier of the page file in the non-volatile memory 202 is compared against the globally unique identifier of the last page file flushed to storage 203. If there is not a match, then the log is scanned from the penultimate snapshot to the storage 203, much as would be performed during normal ARIES recovery.

However, if there is a match, this means that the page file within the non-volatile memory 202 is valid. Accordingly, the snapshots to the non-volatile memory 202 may be used to perform recovery. Accordingly, the scan forward (to identify what pages are to be loaded into volatile memory 201) is begun at the penultimate snapshot to non-volatile memory 202. Thus, in this case, since snapshots to non-volatile memory 202 are performed more frequently during normal forward processing, this means that the log may be scanned from a much later log sequence number. The facts that less of the log needs to be scanned due to more frequent snapshots to non-volatile memory 202, and that more pages to be recovered into the volatile memory 201 may be pulled from the faster-access non-volatile memory means that recovery is much faster. Note that although the snapshot from non-volatile memory may be used, it is possible (but rare because of the relative frequency of the non-volatile memory 202 checkpoints) that the checkpoint to storage 203 will be used if it occurs later than any checkpoint to non-volatile memory 202.

As part of the analysis phase 720, processing normally associated with the analysis phase 720 may also be performed. For instance, active transactions may be identified, the starting point for the redo phase 730 is identified, and the transactions are identified that were active or prepared at the time of the crash are identified.

At this point, all of the transactions in the system are added to the active transaction list in preparation for scanning the log forward from the LSN right after this checkpoint 712. In addition, a dirty page table is constructed, which is initially empty at the beginning of the scan. The ultimate endpoint of the dirty page table is that the dirty page table includes all pages whose minimum log sequence number is greater than the log sequence number of the last flush to the log (i.e., minRecoveryLSN) which is read from the boot block.

The dirty page table also indicates where the most recent version of the page is located, whether it be on the non-volatile memory 202 or whether it be on the storage 203.

In the redo phase 730, all of the prepared transactions identified in the analysis phase 720 are first prepared. Then, all of the pages beginning at the oldest dirty page in the dirty page table (represented by element 714 in FIG. 7) are loaded from the appropriate location identified in the analysis phase 720. This may be performed in accordance with the normal redo phase of an ARIES recovery, except that now, the appropriate source for each page to be loaded into the volatile memory may be either the storage 203, but likely more often, the non-volatile memory 202. Again, since randomly accessible loads from the non-volatile memory 202 are much faster, this speeds up recovery significant. Conventional recovery involves mainly random accesses to retrieve pages from disk media and sequential scans of the log and journal files. In contrast, using the principles described herein, since most or all of the working set of pages are likely in non-volatile RAM, the requests for pages during recovery are more likely random access directed towards non-volatile solid state memory. Such solid state memory is much better at handling random access page requests than disk storage. Accordingly, the redo phase is much more efficient using the principles described herein.

In the undo phase 740, the log 710 is reverse scanned from the end of the log (element 716) all the way back to the beginning of the oldest active transaction (element 711). For any logged actions that are part of an active transaction, those actions are undone.

Thus, an effective, efficient, and fast mechanism for recovering from a computer system crash has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processor(s);
   volatile memory;
   non-volatile storage;

intermediate non-volatile memory that is configured to provide faster random access speeds than the non-volatile storage; and stored computer executable instructions stored in the non-volatile storage or the intermediate non-volatile memory, the computer executable instructions being executable by the one or more processor(s) to cause the computing system to recover from a crash in which a plurality of pages were in the volatile memory at a time of the crash by causing the computing system to:

identify the plurality of pages that were in the volatile memory at the time of the crash, wherein:

a frequency of use corresponding to each page of the plurality of pages is determinable and is used as a basis for assigning different pages to different memory levels in the intermediate non-volatile memory; and identifying the plurality of pages is based on information written to a boot block of the computing system, the boot block being a portion of the non-volatile storage that is accessible during a boot time of the computing system, the information including a unique identifier of a last page file that was flushed from the volatile memory to the non-volatile storage;

for each page of the plurality of pages that were in the volatile memory at the time of the crash and that are also stored in the intermediate non-volatile memory based at least in part on the frequency of use corresponding to each page of the plurality of pages, perform the following:

determine said each page is stored in the intermediate non-volatile memory; and load said each page from the intermediate non-volatile memory into the volatile memory, wherein, when said each page is loaded from the intermediate non-volatile memory, said each page is loaded from said each page's corresponding different memory level which is based at least in part on said each page's corresponding different memory level's frequency of use.

2. The computing system in accordance with claim 1, wherein the intermediate non-volatile memory is storage class memory.

3. The computing system in accordance with claim 1, wherein the intermediate non-volatile memory is a solid state disk.

4. The computing system in accordance with claim 1, wherein the different memory levels are organized according to a hierarchy, and wherein pages that are determined to have a relatively higher frequency of use are loaded into a memory level that is higher in the hierarchy than pages that are determined to have a relatively lower frequency of use.

5. The computing system in accordance with claim 4, wherein the different memory levels correspond to different access speeds.

6. The computing system in accordance with claim 1, wherein execution of the computer executable instructions further causes the computing system to:

construct a mapping that identifies a location of a recovery version of each page within the intermediate non-volatile memory.

7. The computing system in accordance with claim 6, wherein loading said each page is based on a use of the mapping.

8. A recovery method implemented by a computing system that includes volatile memory, non-volatile storage, and intermediate non-volatile memory that is configured to provide faster random access speeds than the non-volatile storage, the method being implemented to recover the computing system from a crash in which contents of the volatile memory are lost, the method comprising:

identifying a plurality of pages that were in the volatile memory at a time of the crash, wherein:

a frequency of use corresponding to each page of the plurality of pages is determinable and is used as a basis for assigning different pages to different memory levels in the intermediate non-volatile memory; and identifying the plurality of pages is based on information written to a boot block of the computing system, the boot block being a portion of the non-volatile storage that is accessible during a boot time of the computing system, the information including a unique identifier of a last page file that was flushed from the volatile memory to the non-volatile storage;

for each page of the plurality of pages that were in the volatile memory at the time of the crash and that are also stored in the intermediate non-volatile memory based at least in part on the frequency of use corresponding to each page of the plurality of pages, performing the following:

determining said each page is stored in the intermediate non-volatile memory; and loading said each page from the intermediate non-volatile memory into the volatile memory, wherein, when said each page is loaded from the intermediate non-volatile memory, said each page is loaded from said each page's corresponding different memory level which is based at least in part on said each page's corresponding different memory level's frequency of use.

9. The method in accordance with claim 8, wherein the intermediate non-volatile memory is storage class memory.

10. The method in accordance with claim 8, wherein the intermediate non-volatile memory is a solid state disk.

11. The method in accordance with claim 8, further comprising:

constructing a mapping that identifies a location of a recovery version of each page within the intermediate non-volatile memory.

12. The method in accordance with claim 11, wherein loading said each page uses the mapping.

13. The method in accordance with claim 8, wherein the different memory levels are organized according to a hierarchy, and wherein pages that are determined to have a relatively higher frequency of use are loaded into a memory level that is higher in the hierarchy than pages that are determined to have a relatively lower frequency of use.

14. The method in accordance with claim 13, wherein the different memory levels correspond to different access speeds.

15. The method in accordance with claim 8, wherein identifying the plurality of pages that were in the volatile memory at the time of the crash comprises the following:

identifying a last log sequence number flushed to a log in the non-volatile storage;

sequentially reviewing log entries of the log from the last log sequence number flushed to the log, wherein the plurality of pages that were in the volatile memory at the time of the crash are identified based on the sequential review; and identifying transactions that were active at the time of the crash based on the sequential review.

16. The method in accordance with claim 8, further comprising:
identifying transactions that were active at the time of the crash; and
undoing actions of each of the active transactions.

17. The method in accordance with claim 8, further comprising:
determining one or more transactions were prepared at the time of the crash; and
preparing each of the one or more transactions that were prepared at crash time, wherein the preparing occurs prior to the loading of said each page from the intermediate non-volatile memory into the volatile memory.

18. A computer program product comprising one or more computer-readable hardware storage device(s) having stored thereon computer executable instructions that are executable by one or more processor(s) of a computing system for causing the computing system to recover from a crash in which a plurality of pages were in volatile memory of the computing system at a time of the crash, by causing the computing system to:
identify the plurality of pages that were in the volatile memory at the time of the crash, wherein:
a frequency of use corresponding to each page of the plurality of pages is determinable and is used as a basis for assigning different pages to different memory levels in the intermediate non-volatile memory; and
identifying the plurality of pages is based on information written to a boot block of the computing system, the boot block being a portion of the non-volatile storage that is accessible during a boot time of the computing system, the information including a unique identifier of a last page file that was flushed from the volatile memory to the non-volatile storage;
for each page of the plurality of pages that were in the volatile memory at the time of the crash and that are also stored in the intermediate non-volatile memory based at least in part on the frequency of use corresponding to each page of the plurality of pages, perform the following:
determine said each page is stored in the intermediate non-volatile memory; and
load said each page from the intermediate non-volatile memory into the volatile memory, wherein, when said each page is loaded from the intermediate non-volatile memory, said each page is loaded from said each page's corresponding different memory level which is based at least in part on said each page's corresponding different memory level's frequency of use.

19. The computer program product in accordance with claim 18, wherein the different memory levels are organized according to a hierarchy, and wherein pages that are determined to have a relatively higher frequency of use are loaded into a memory level that is higher in the hierarchy than pages that are determined to have a relatively lower frequency of use.

20. The computer program product in accordance with claim 19, wherein the different memory levels correspond to different access speeds.

* * * * *